No. 725,948. PATENTED APR. 21, 1903.
M. FLYNN.
DOMESTIC BOILER.
APPLICATION FILED NOV. 15, 1902.
NO MODEL.
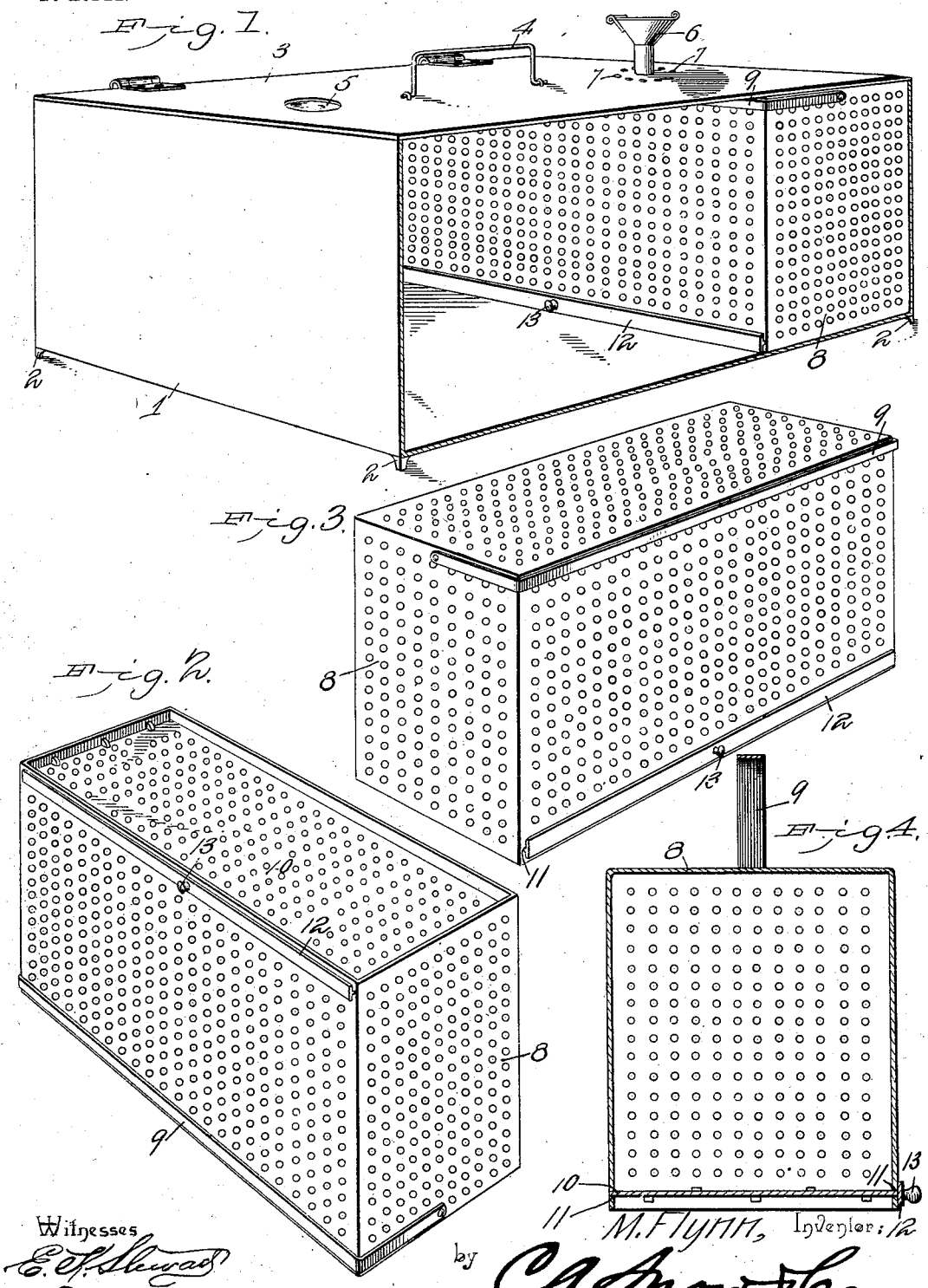

UNITED STATES PATENT OFFICE.

MARY FLYNN, OF WASHINGTON, DISTRICT OF COLUMBIA.

DOMESTIC BOILER.

SPECIFICATION forming part of Letters Patent No. 725,948, dated April 21, 1903.

Application filed November 15, 1902. Serial No. 131,546. (No model.)

*To all whom it may concern:*

Be it known that I, MARY FLYNN, a citizen of the United States, residing at Washington, in the District of Columbia, have invented a new and useful Domestic Boiler, of which the following is a specification.

My invention relates to domestic boilers, and is especially designed for cooking asparagus, though it may be employed for cooking other foods or vegetables, and has for its object to produce a device of this character from which the cooked food may be readily discharged in an unbroken condition.

The invention consists of the details of construction and combination of parts more fully hereinafter pointed out.

In the accompanying drawings, Figure 1 is a perspective view of the boiler, having one side removed to expose to view the food-receptacle therein. Fig. 2 is a perspective view of the food-receptacle removed and in position to receive the food, with the bail or handle folded down. Fig. 3 is a similar view in position to discharge the food, the bail or handle raised. Fig. 4 is a vertical transverse section through the receptacle, showing the slide partly withdrawn.

Referring to the drawings, 1 indicates the outer casing or boiler proper, made from any suitable sheet metal, preferably tin or iron, and provided with feet 2 and a cover 3, which latter I have shown as hinged, though it may close in any suitable manner. The cover is provided with an operating-handle 4 and with a sight-hole 5, closed by glass, mica, or the like, through which the interior of the boiler may be inspected for any desired purpose during operation.

6 is a funnel-shaped tube mounted on the cover 3 and communicating with the interior of the boiler, through which water may be introduced into the boiler when desired. This tube or funnel is suitably closed at its top normally to prevent escape of steam.

7 indicates a series of small holes or perforations in the cover, preferably around the base of the funnel, through which a limited quantity of steam may escape to relieve the pressure in the boiler.

8 is the food-receptacle, which I have shown as composed of perforated sheet metal, though it is to be understood that the same may be made of wire-gauze or the like, which admits of the steam freely penetrating to the contained food. This receptacle is provided with a suitable bail or handle 9, adapted to be folded when the receptacle is placed in the boiler. While I consider the bail shown as being the simplest and best for the purpose, it may be of any other desired construction.

10 is a slide which normally closes one side of the receptacle and through which the cooked food may be discharged by withdrawing the slide. This slide is preferably inserted through and operates in slots 11, formed in the transverse side of the vessel, the slide being provided at one edge with a suitable flange 12, which insures its accurate insertion, and with a tongue or handle 13, by which it may be manipulated.

In operation the receptacle 8 is turned to the position shown in Fig. 2, with the bail folded, the slide 10 is withdrawn, and the food to be steamed is placed in the vessel. The slide is then closed and the receptacle turned to the position shown in Fig. 3. The operator then turns the bail up, grasps the same, and places the receptacle into the boiler 1, with the slide side of the receptacle downward and with the bail again folded to a non-obstructing position. When the food has properly cooked, the receptacle is by means of the bail again lifted from the boiler and placed over the dish in which the food is to be served with the slide downward, and the slide is withdrawn to discharge the contents of the vessel.

From this construction it will be readily seen that I produce a device from which the cooked food may be readily and directly discharged without fear of breaking or otherwise marring the food in appearance. In attaining this object I do not limit or confine myself to the details herein shown and described, as various changes may be made in the device without departing from the scope of my invention.

Having thus described my invention, what I claim is—

The combination with a casing or boiler proper, of a perforated removable food-receptacle therefor, provided at one side with a bail or handle, adapted to fold down and lie snugly against the side of the receptacle, a slide normally closing the opposite side of the receptacle and means for operating the slide.

In testimony that I claim the foregoing as my own I have hereto affixed my signature in the presence of two witnesses.

MARY FLYNN.

Witnesses:
J. H. JOCHUM, Jr.,
J. ROSS COLHOUN.